United States Patent
Wu et al.

(10) Patent No.: US 7,027,118 B1
(45) Date of Patent: Apr. 11, 2006

(54) FULL COLOR TRANSFLECTIVE CHOLESTERIC LIQUID CRYSTAL DISPLAY WITH SLANT REFLECTORS ABOVE TRANSMISSIVE PIXELS

(75) Inventors: Shin-Tson Wu, Oviedo, FL (US); Yi-Pai Huang, Hsin-Chu (TW); Xinyu Zhu, Orlando, FL (US); Hongwen Ren, Orlando, FL (US); Thomas X. Wu, Orlando, FL (US)

(73) Assignees: University of Central Florida Research Foundation, Inc., Orlando, FL (US); Toppoly Optoelectronics Corp, Maio-Li (TW)

( * ) Notice: Subject to any disclaimer, the term of this patent is extended or adjusted under 35 U.S.C. 154(b) by 0 days.

(21) Appl. No.: 10/625,191

(22) Filed: Jul. 23, 2003

Related U.S. Application Data

(63) Continuation-in-part of application No. 10/430,019, filed on May 5, 2003, now Pat. No. 6,801,281.

(60) Provisional application No. 60/399,218, filed on Jul. 29, 2002, provisional application No. 60/378,304, filed on May 6, 2002.

(51) Int. Cl.
   *G02F 1/1335* (2006.01)

(52) U.S. Cl. .................. 349/114; 349/113
(58) Field of Classification Search ............ 349/114, 349/113, 106
See application file for complete search history.

(56) References Cited

U.S. PATENT DOCUMENTS

| | | | |
|---|---|---|---|
| 5,949,513 A | 9/1999 | Ma et al. | 349/187 |
| 6,057,008 A * | 5/2000 | Schwalb et al. | 428/1.1 |
| 6,061,107 A | 5/2000 | Yang et al. | 349/86 |
| 6,377,321 B1 | 4/2002 | Khan et al. | 349/35 |
| 2001/0017674 A1 * | 8/2001 | Yamaguchi et al. | 349/61 |
| 2002/0018279 A1 * | 2/2002 | Molsen | 359/247 |
| 2002/0145688 A1 * | 10/2002 | Sekiguchi | 349/114 |
| 2003/0210366 A1 * | 11/2003 | Huang et al. | 349/113 |
| 2004/0257357 A1 * | 12/2004 | Yamazaki et al. | 345/206 |

OTHER PUBLICATIONS

Yuzo Hisatake, et al (Toshiba), International Display Workshop (2001), p. 129.
Rob van Asselt, et al. (Philips), SID'00, p. 742.

* cited by examiner

*Primary Examiner*—Andrew Schechter
*Assistant Examiner*—(Nancy) Thanh-Nhan P. Nguyen
(74) *Attorney, Agent, or Firm*—Brian S. Steinberger; Law Offices of Brian S. Steinberger, P.A.

(57) ABSTRACT

A device and method for making full color cholesteric displays such as a narrow band and a broad band cholesteric display using high birefringence LC materials with color filtering processes. The invention includes positioning slant reflector(s) in the transmissive portion of the display to reflect backlight into reflection pixels. The LCD can display the same color images in both reflective and transmissive modes, maintain good readability in any ambient, has low power consumption, high brightness, full color capability and has a fabrication process that is compatible with conventional LCD fabrication.

15 Claims, 10 Drawing Sheets

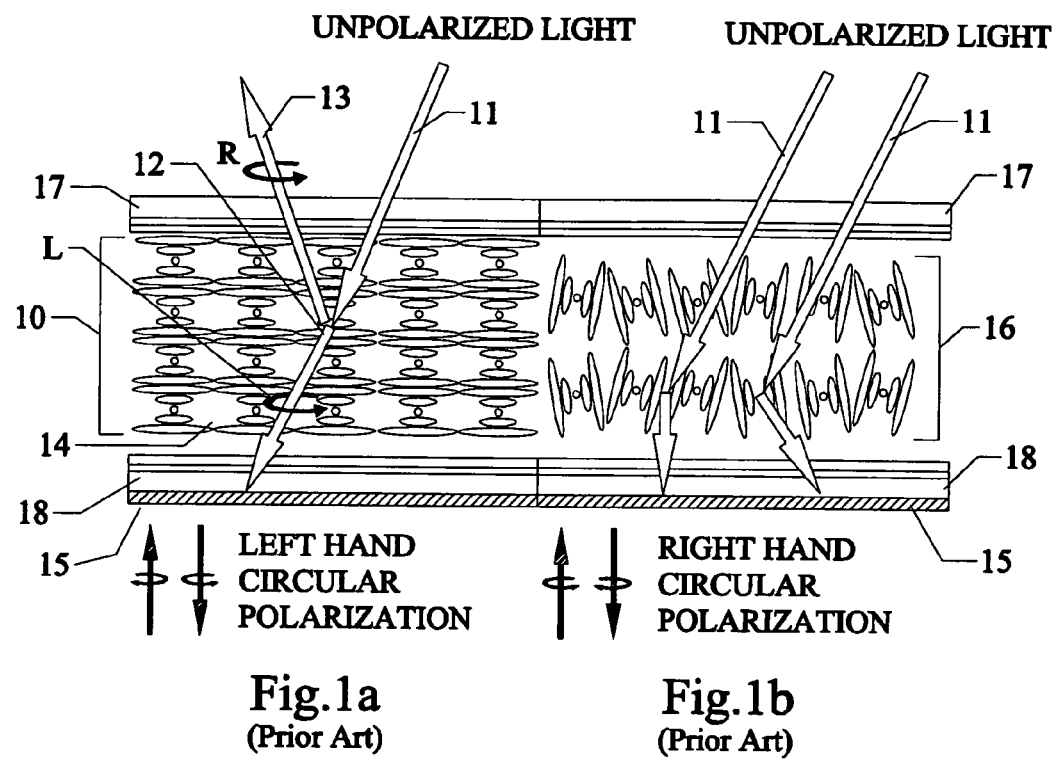
Fig.1a
(Prior Art)
Fig.1b
(Prior Art)
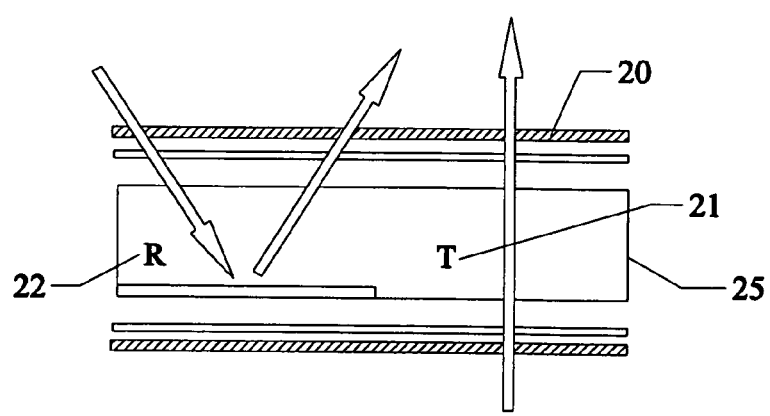
Fig.2
(Prior Art)

(LEFT: VOLTAGE OFF)

(RIGHT: VOLTAGE ON)
(PRIOR ART)

REFLECTIVE MODE
V=VOLTAGE

V OFF: BRIGHT

V APPLIED: DARK

REFLECTION

TRANSMISSIVE MODE
V=VOLTAGE

V OFF: DARK

V APPLIED: BRIGHT

TRANSMISSION

Fig.9a
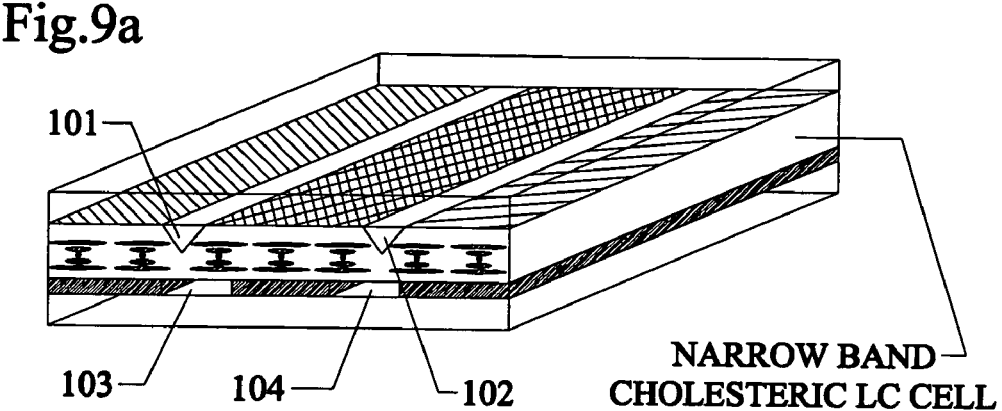
101
103   104   102
NARROW BAND CHOLESTERIC LC CELL
SUBSTRATE   101   102
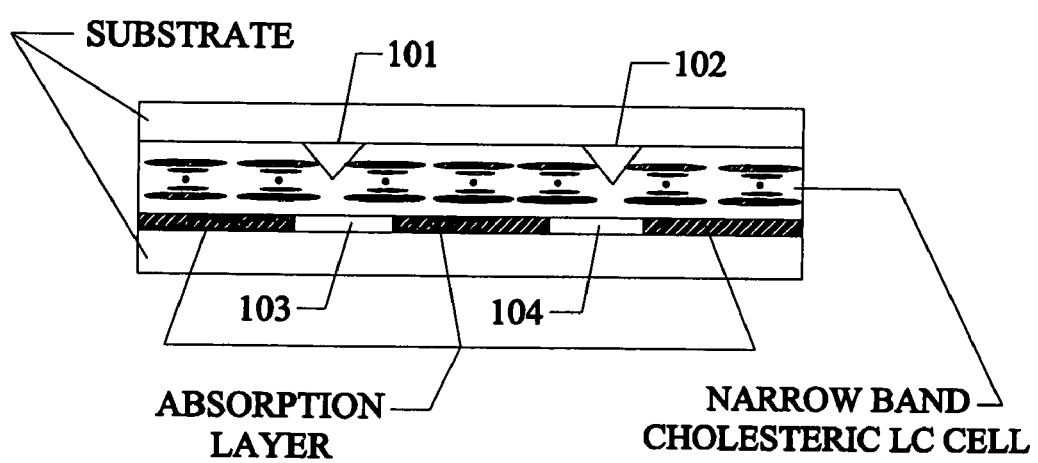
103   104
ABSORPTION LAYER   NARROW BAND CHOLESTERIC LC CELL
Fig.9b

FULL COLOR TRANSFLECTIVE CHOLESTERIC LIQUID CRYSTAL DISPLAY WITH SLANT REFLECTORS ABOVE TRANSMISSIVE PIXELS

This invention is a Continuation-in-Part of U.S. Utility patent application Ser. No. 10/430,019 filed on May 5, 2003, now U.S. Pat. No. 6,801,281 issued on Oct. 5, 2004; and claims the benefit of priority U.S. Provisional Application 60/399,218 filed on Jul. 29, 2002 and to U.S. Provisional Patent Application 60/378,304 filed on May 6, 2002.

FIELD OF INVENTION

This invention relates to transflective liquid crystal displays (LCDs) and in particular to methods and apparatus for providing full color cholesteric displays using high birefringence LC materials with color filtering processes.

BACKGROUND AND PRIOR ART

The transmission-type liquid crystal display (LCD) exhibits a high contrast ratio and good color saturation. However, its power consumption is high due to the need of a backlight. At bright ambient, the display could be washed out completely. On the other hand, a reflective LCD is using ambient light for reading displayed images. Since it does not require a backlight, its power consumption is reduced significantly.

Reflective cholesteric liquid crystal display (Ch-LCD) is a bistable device. Once the LC directors are reoriented, they stay. Thus, Ch-LCD consumes less power than the general reflective twisted nematic (TN) LCD, super-twisted nematic (STN) LCD or thin film transistor (TFT) LCD. Due to its bistability, the driving voltage is required only when a user wants to refresh the screen. This power-saving feature is especially important for reading books or magazines. An ordinary person may take 2–3 minutes to finish reading a page. Thus, Ch-LCD is a strong contender for electronic newspaper or books.

The operating principle of reflective cholesteric display is shown in FIG. 1(a) and FIG. 1(b). FIG. 1(a) shows the bright state of a Ch-LCD wherein the cholesteric LC molecules 10 are arranged in layers with the helical axes perpendicular to top substrate 17 and bottom substrate 18. When an unpolarized light 11 is incident to a right-hand cholesteric LC layer 12, the right-hand circularly polarized light 13 within the bandwidth is reflected and the transmitted left-hand circularly polarized light 14 is absorbed by the absorption layer 15, which can be black paint. In a high voltage state as shown in FIG. 1(b), the cholesteric LC layer was driven into a focal conic state 16 wherein the LC molecules are almost aligned with the helical axes parallel to top substrate 17 and bottom substrate 18. Thus, the incident light passes through the LC layer and is absorbed by the absorption layer 15, resulting in a dark state.

However, at dark ambient, a reflective LCD loses its visibility. To enable a reflective display to be usable for dark ambient, a transflective display has been invented. In a transflective display, illustrated in FIG. 2, each pixel 20, having a single cell gap 25, is divided into transmissive 21 and reflective 22 portions, sometimes called sub-pixels. The transflective display is the most versatile because it works great in well-lighted and poorly lighted environments. However, cholesteric displays are not workable on such transflective structure. As FIG. 3(a) shows, unpolarized light 30 is reflected 32 and unpolarized backlight 31 is transmitted 33 in each sub-pixel, resulting in a bright state when no voltage is applied. Such display lacks a dark state. In FIG. 3(b), the ambient light 34 is absorbed in the reflective portion 35 of the sub-pixel. However, the backlight 36 transmits through the transmissive portion 37 of the sub-pixel. Thus, the transmissive portion has no dark state, with the voltage on or off.

Cholesteric liquid crystal is known to possess memory effects. Thus, its power consumption is much lower than the TN LCD or STN LCD. Table 1 summarizes the calculated battery time of a video graphics array (VGA), 6.3-inch diagonal full color display for different display technologies. Obviously, the cholesteric display offers a significant power saving over the STN and active matrix TFT LCDs. When considering an average reading time of one minute per page, the cholesteric LCD of the present invention provides more than 370 additional hours of display time between battery recharges when compared to a bistable reflective cholesteric display with passive matrix addressing.

Table 1. Calculated battery life of a VGA, 6.3-inch diagonal full color display in terms of the battery is 5.4 Watt-hours lifetime or operating time between battery recharges for different display technologies.

| Display Technologies | Time Between Recharges for Various Average Reading Times | | |
|---|---|---|---|
| | 1 min/page | 2 min/page | 5 min/page |
| Refreshed type display with backlight such as an STN or Active Matrix TN. | 2 hrs | 2 hrs | 2 hrs |
| Refreshed type reflective display with smart electronics. | 18 hrs | 18 hrs | 18 hrs |
| Bistable reflective Cholesteric display passive matrix addressing. | 270 hrs | 540 hrs | 1350 hrs |
| Bistable reflective Cholesteric display active matrix addressing 50% pixel change. | 640 hrs | 1280 hrs | 3200 hrs |

Various prior art references related to transflective cholesteric displays are found. The two published papers are: 1. *International Display Workshop* (2001), p. 129, by Yuzo Hisatake et al, (Toshiba), and 2. *SID '00*, p. 742, by Rob van Asselt et al (Philips). The device structures are shown in FIG. 4(a) through FIG. 4(f), respectively. The display device from Philips includes a polarizer 40, a retardation film 41, a non-twist LC layer 42a (with voltage off) and 42b (with voltage on), a cholesteric transflector 43 and absorption layer 44. In reflective mode, when no voltage is applied, a bright state will occur as shown in FIG. 4(a); while under applied voltage, as shown in FIG. 4(b), the phase retardation of non-twist LC layer 42b changes half-wave. Therefore, the circularly polarized light changes twist sense accordingly and passes through the cholesteric transflector 43 and is finally absorbed by the absorption layer 44, resulting in a dark state. FIG. 4(c) shows the normally white image 45a in reflective mode. In transmissive mode, when no voltage is applied, non-twist LC layer 48a remains flat, no light can pass through polarizer 46 and a dark state occurs, as shown in FIG. 4(d). Under applied voltage, as shown in FIG. 4(e), the linearly polarized light changes 90° since phase retardation of non-twist LC layer 48b changes half-wave, therefore the linearly polarized light passes through polarizer 46, resulting in a bright state. FIG. 4(f) shows the normally black image 45b in transmissive mode. The major difference between Philips' display and previous cholesteric displays, as shown in FIGS. 1(a) and 1(b), is that in Philips' display, the cholesteric layer is used as a transflective reflector, no voltage is applied to switch the cholesteric layer. In previous cholesteric display references, the cholesteric layer is used as a light switch.

Three issued patents are found related to the full color cholesteric displays. The first one is U.S. Pat. No. 6,377,321 in which a full color cholesteric display was fabricated by stacking three cells of primary RGB (Red, Green and Blue) colors. See FIG. 5(a). The second is U.S. Pat. No. 6,061,107 in which different UV intensity is used to generate RGB pixels with different pitch lengths (FIG. 5(b)), and the third is U.S. Pat. No. 5,949,513 in which different twist agents are used to generate RGB color pixels (FIG. 5(c)).

In the panel stacking system 50 as shown in FIG. 5(a), parallax problems will occur because of the reflective image from three different stacking layers when viewed from an oblique direction. This parallax would greatly limit the device resolution. To reduce parallax, the substrate thickness has to be reduced to less than 0.3 mm, which can only be achievable by using plastic substrates. Additionally, pixel registration is another concern. These additional steps will undoubtedly increase the fabrication time and cost. FIG. 5(b) shows the prior art using different UV intensity 51 to generate red, green, blue (RGB) pitch lengths. The three primary color pixels need to be cured by different UV intensity. This is a rather complicated process and cannot be done in a single mask. FIG. 5(c) shows the method of using different twist agent doping. As the drawing shows, there is a need for wells 52, 53, 54, 55 in order to separate three primary color regions and to deposit two different twist agents 56, 57.

A common drawback of the above-mentioned prior art devices is that they are reflective displays, i.e., they need ambient light to read the displayed information contents. In a dark ambient, these displays are not readable. Even if it can achieve a transflective display, the contrast ratio at reflective mode and transmissive mode is reversed, which will actually decrease the contrast ratio if both modes work simultaneously.

SUMMARY OF THE INVENTION

A primary objective of the present invention is to provide full color cholesteric displays using high birefringence LC (liquid crystal) materials using conventional color filtering processes which are more compatible with conventional fabrication processes.

The second objective of the present invention is to provide full color cholesteric displays which can display same color images both in reflective and transmissive modes and maintain good readability in any ambient.

The third objective of the present invention is to provide full color cholesteric displays that consume much less power than other LCDs.

The fourth objective of this invention is to provide full color cholesteric displays having a high brightness that does not require any polarizer, where its light efficiency is superior to existing transflective full color STN and TFT-LCDs.

The fifth objective of the present invention is to provide full color cholesteric displays having a wide bandwidth.

The sixth objective of the present invention is to provide full color cholesteric displays having a full color display that can be easily achieved by coating the color filters.

The seventh objective of the present invention is to provide full color cholesteric displays that are compatible with conventional STN and TN LCDs where a full color transflective cholesteric display can be fabricated by using wide band cholesteric liquid crystal, coating slant reflector and color filters on the backside of top glass. The fabrication processes are similar to those of STN and TN LCDs.

The present invention provides a full color cholesteric display by using high birefringence LC material with conventional color filter process, as shown in FIG. 6(a) and FIG. 6(b), which is much more compatible with conventional fabrications and can be done easily. FIG. 6(a) is a perspective view of a wide band reflective cholesteric LC cell 60 of the present invention with conventional color filters 61, 62, 63. FIG. 6(b) is a cross-sectional view of a wide band LC cell of the present invention showing the cholesteric LC molecules 64 aligned parallel between a bottom substrate 65 and a top substrate 66 having color filter layer 67 interposed between the top substrate and the cholesteric LC molecules 64. Moreover, a pixel is split into reflective and transmissive sub-pixels, as explained in more detail below. Under bright ambient, the backlight is not needed and the display behaves like a reflection type. However, at dark ambient, the backlight is turned on and the display acts as a transmission type. This transflective display is not limited by the environment conditions.

Further objects and advantages of this invention will be apparent from the following detailed description of a presently preferred embodiment, which is illustrated, schematically in the accompanying drawings.

BRIEF DESCRIPTION OF THE FIGURES

FIG. 1(a) shows a prior art view of a cholesteric display with a Bright state, voltage off.

FIG. 1(b) shows a prior art view of a cholesteric display with a Dark state, voltage on.

FIG. 2 shows a prior art schematic view of a transflective display with single cell gap.

FIG. 4(b) is a prior art view of a transflective cholesteric display by using cholesteric layer as a transflector, voltage on.

FIG. 4(e) is a prior art view of a transflective cholesteric display by using cholesteric layer as a transflector, voltage on.

FIG. 9(a) shows a perspective view of a narrow band transflective cholesteric display.

FIG. 9(b) shows a cross-sectional view of FIG. 9(a).

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 7A:
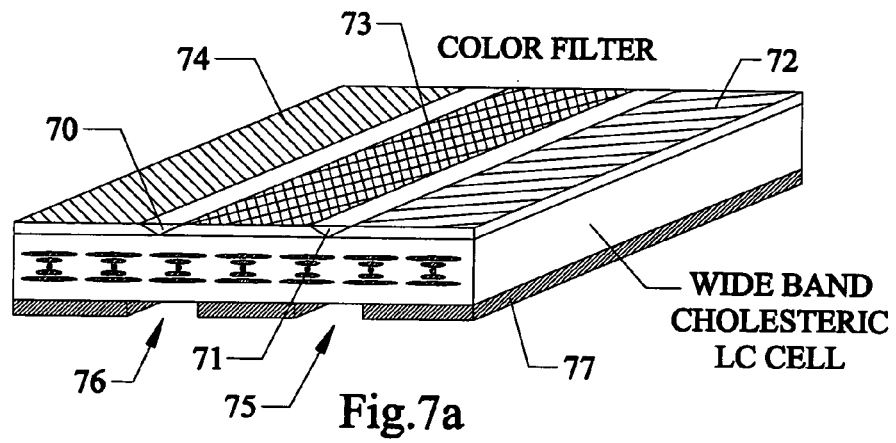
FIG. 7(a) is a schematic plot of the novel full color transflective cholesteric LCD with slant front reflector and wide band reflective cholesteric LC.
Figure 7B:
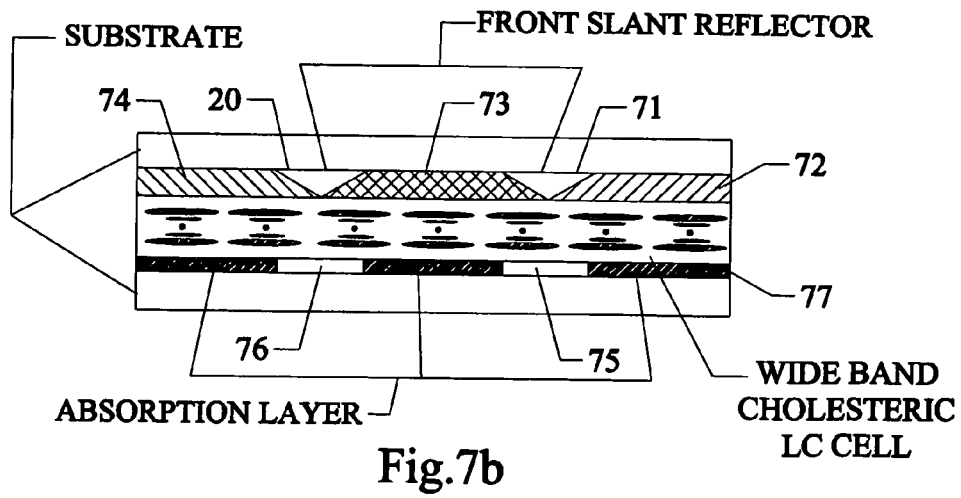
FIG. 7(b) is a cross-sectional view of FIG. 7(a).

The invention provides a new device structure for the full color transflective cholesteric liquid crystal display (LCD). The novelties are twofold. 1. Each pixel is divided into reflective and transmissive portions. In the transmissive portion, a slant reflector is in position to reflect the backlight into the reflection pixels. This slant reflector design works equally well for both narrow and broad band cholesteric displays. 2. To achieve full color display, high birefringence LC materials are used to achieve black and white displays and implement RGB color filters. The perspective view in FIG. 7(a) and cross-sectional view in FIG. 7(b) show one embodiment of this novel structure. The front slant reflectors 70, 71 are implemented on the same substrate as the color filters 72, 73, 74. The slant reflectors 70, 71 are right above the transmissive sub-pixels 75, 76 so that they reflect the backlight into reflective region. The absorption layer 77 can be black paint or black dye, as used in the prior art. The black paint or dye absorbs the leaked light and provides a good black state.

Figure 8A:
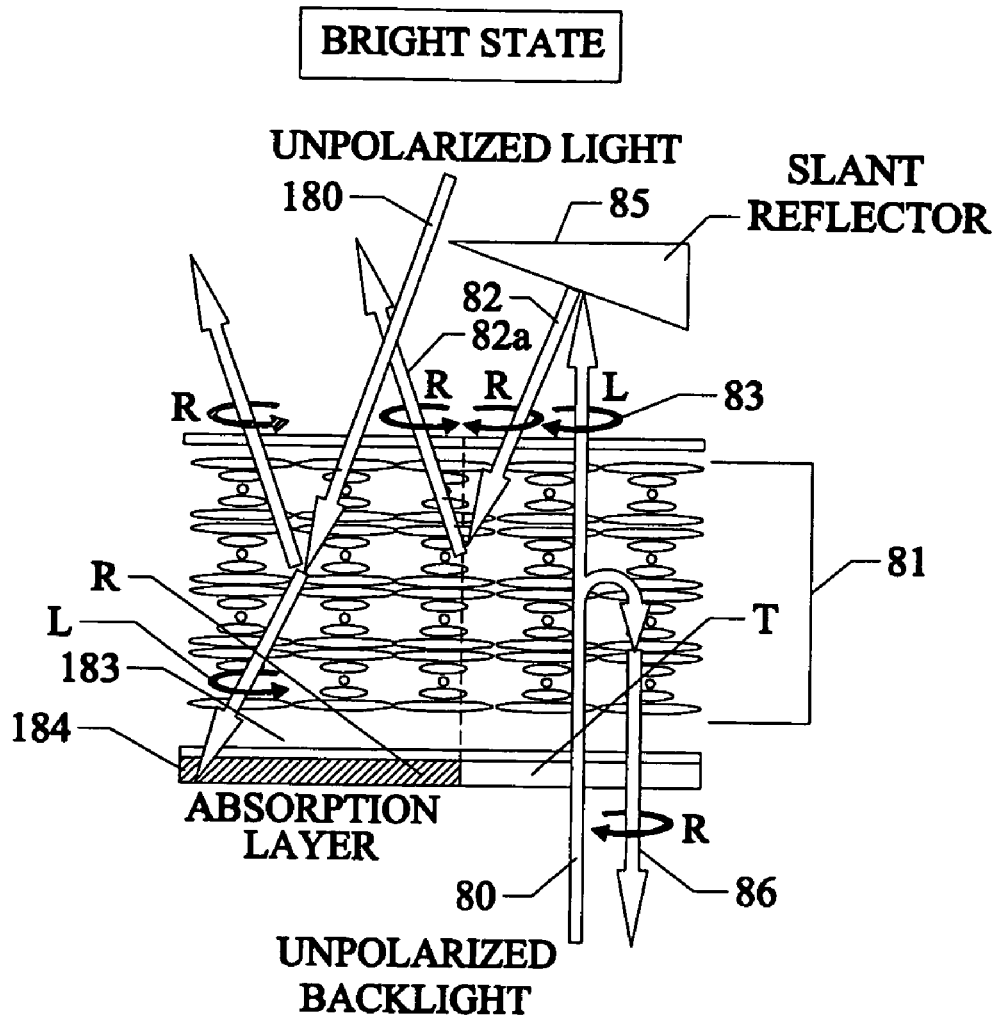
FIG. 8(a) is a side view of the novel full color transflective cholesteric LCD with slant front reflector and broadband cholesteric LC in a bright state.
Figure 8B:
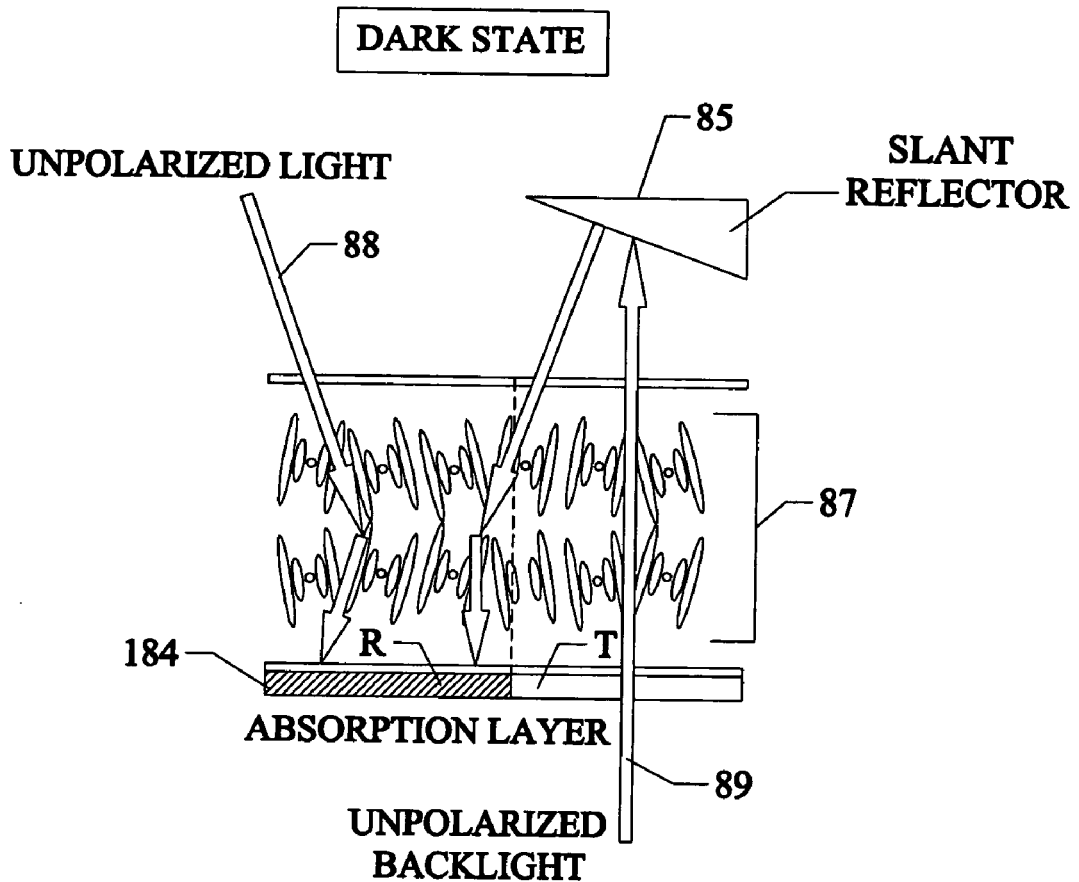
FIG. 8(b) is a side view of the novel full color transflective cholesteric LCD with slant front reflector and broadband cholesteric LC in a dark state.
Figure 8B:
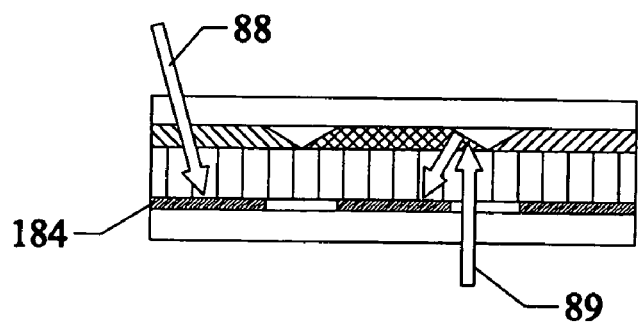

FIGS. 8(a) and 8(b) illustrate the operating mechanisms of a right-handed cholesteric (RCH) LC in the novel transflective cholesteric display. In FIG. 8(a), an unpolarized ambient light 180 is incident to the reflective pixels. If the cholesteric layer is right handed so that it reflects the right-hand (R) circularly polarized light 182 and transmits the left-handed (L) part 183. The transmitted L light is absorbed by the absorption layer 184. As a result, a bright state is obtained. On the transmission channel from backlight 80, the R light 86 is reflected back and L 83 is transmitted to hit the slant reflector 85. Upon reflection, the L light becomes R 82 and is reflected 82A by the cholesteric LC layer to the viewer. Again, the bright state is observed. Thus, in FIG. 8(a) the bright state is observed in both the reflective and transmissive portions of the pixel, when the voltage is off. The same bright state for both reflective and transmissive channels is critically important. This is because in a not-too-dark ambient, the backlight may need to be turned on to assist readability.

On the other hand, in a high voltage state the cholesteric liquid crystal layer is reoriented to a clear homeotropic state 87, as shown in FIG. 8(b). Unlike the cholesteric state 81 in FIG. 8(a), the homeotropic state does not selectively reflect or transmit the input polarization. Both the incident ambient 88 and back light 89 are transmitted by the LC layer 87 and absorbed by the absorption layer 184, which is usually a black paint or black dye. As a result, the dark state appears.

The reflection bandwidth of a cholesteric LCD is proportional to the birefringence (Δn) and pitch length (P) as Δλ=pΔn. If the central reflection wavelength is at $\lambda_o$=550 nm. a high birefringence LC (Δn~0.5) would lead to a wide reflection bandwidth. It is one of the objectives of the present invention to achieve a broad reflection band covering the entire visible spectrum, i.e., from 400 to 700 nm. Under such condition, a black and white cholesteric display can be realized. Since the reflected light is white, a pattern of the conventional color filters can be made and used to obtain full color displays. The fabrication processes for color filters and slant reflectors are standard in LCD manufacturer.

The wide band device with color filters, as shown in FIGS. 8(a) and 8(b), preserves a better light efficiency than the STN and TN structures because it does not require a polarizer. Ideally, the B/W cholesteric display has approximately 50% reflectivity. Adding color filters would reduce the light efficiency to ⅓. Thus, for each color pixel, its light efficiency is approximately 16.7%. For a single polarizer-based TFT-LCD, the polarizer alone cut the light efficiency to approximately 37%. With color filters (30%) and TFT aperture ratio (80%), the net light efficiency is further reduced to approximately 9%. Without a polarizer, the device will exhibit a brighter image.

Figures 3A, 3B:
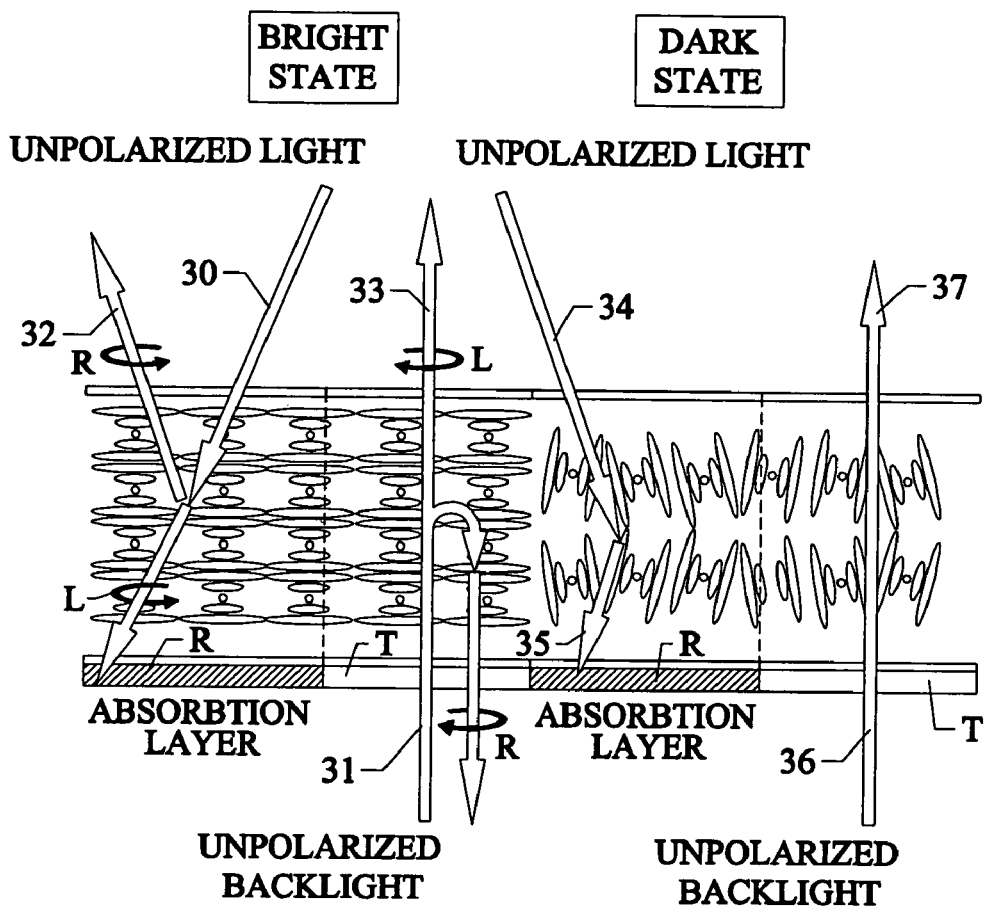
FIG. 3(a) is a prior art transflective cholesteric display with voltage off (bright state).
FIG. 3(b) is a prior art transflective cholesteric display with voltage on (dark state).
Figure 4A:
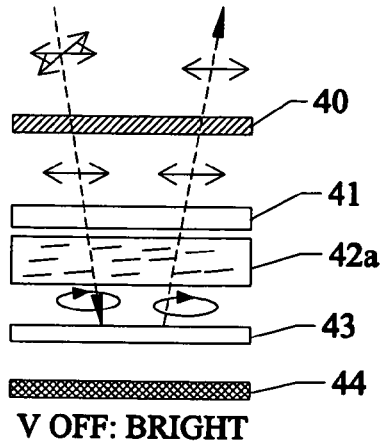
FIG. 4(a) is a prior art view of a transflective cholesteric display by using cholesteric layer as a transflector, voltage off.
Figure 4B:
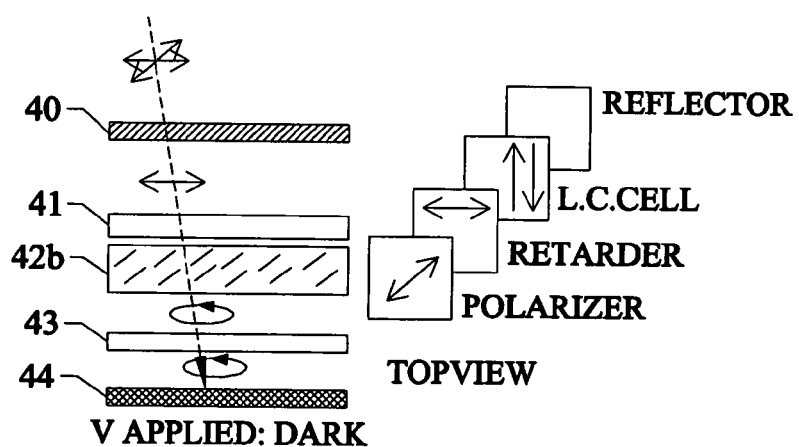
Figure 4C:
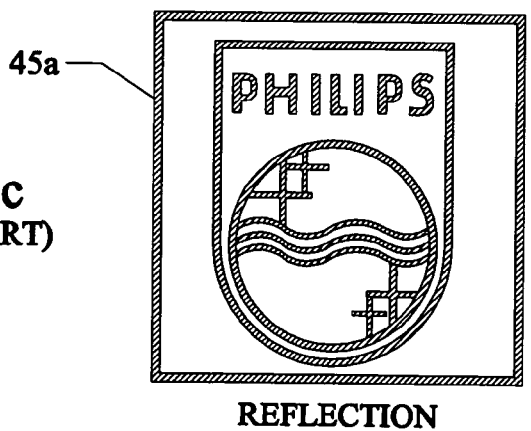
FIG. 4(c) is a prior art reflective mode image of a transflective cholesteric display.
Figure 4D:
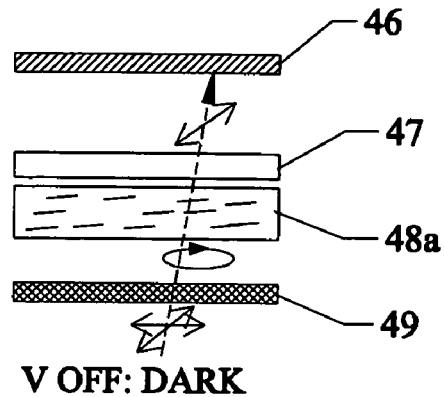
FIG. 4(d) is a prior art view of a transflective cholesteric display by using cholesteric layer as a transflector, voltage off
Figure 4E:
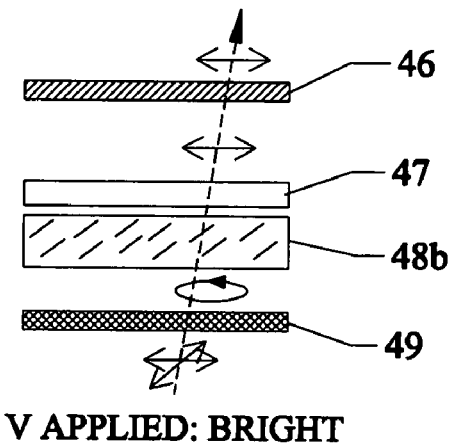
Figure 4F:
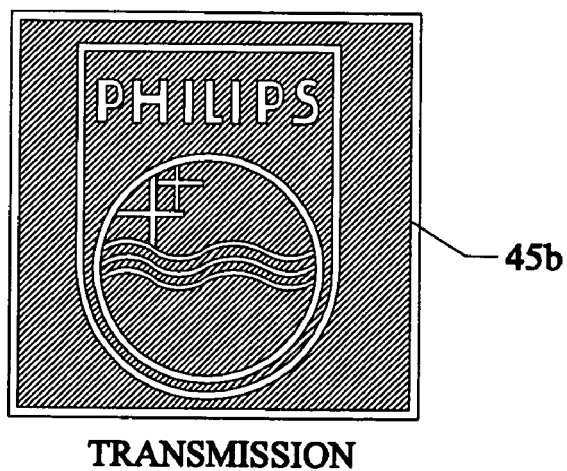
FIG. 4(f) is a prior art transmissive mode image of a transflective cholesteric display.
Figure 5A:
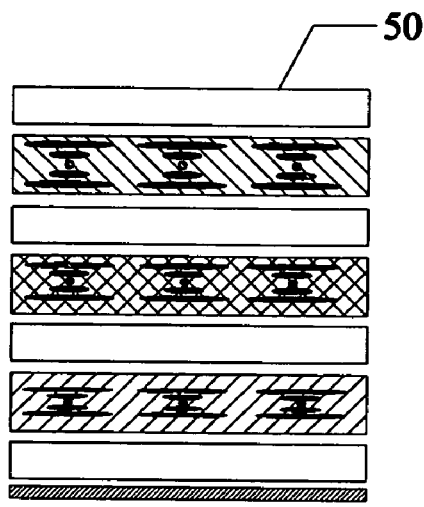
FIG. 5(a) is a prior art cross-sectional view of stacking cells in full color cholesteric displays.
Figure 5B:
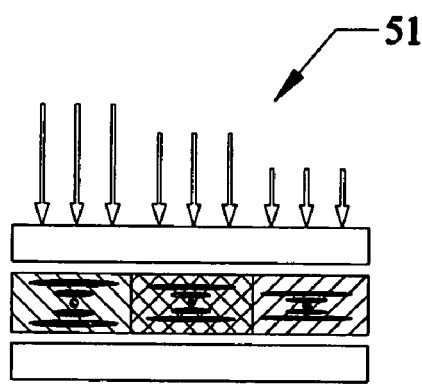
FIG. 5(b) is a prior art cross-sectional view of different UV intensity curing in full color cholesteric displays.
Figure 5C:
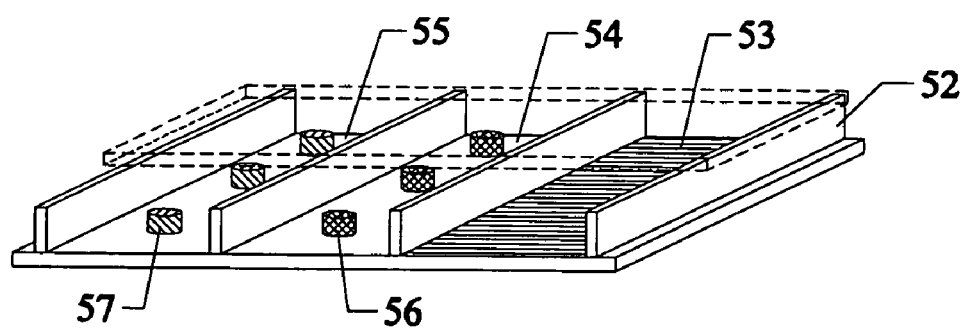
FIG. 5(c) is a prior art perspective view of different twist agent deposits in full color cholesteric displays.
Figure 6A:
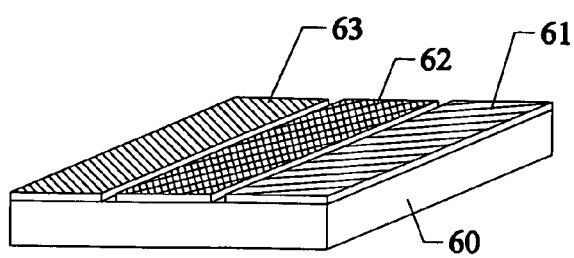
FIG. 6(a) shows a perspective view of full cholesteric display of the present invention using a wide band reflective cholesteric LC cell with conventional color filter processes.
Figure 6B:
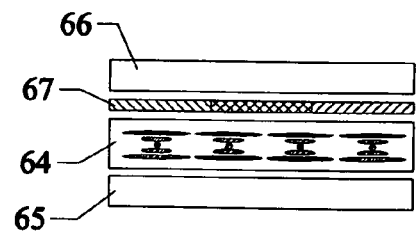
FIG. 6(b) shows a cross-sectional view of FIG. 6(a).

Several novel features of such transflective cholesteric LCD have been identified. First, the LCD can display the same color image in any ambient. The conventional reflective cholesteric displays are not readable in dark ambient. Some prior art applications have used the cholesteric layer as a transflector to display the image in dark ambient. However, it exhibits an inverse color image, as the photos shown in FIGS. 4(c) and 4(f). The present invention can display the same color images in both reflective and transmissive modes and maintain good readability in any ambient. Both the ambient light and the backlight pass through the color filters twice; therefore, the displays in the present invention have the same color saturation.

Second, the LCD of the present invention has low power consumption. The low power consumption is due to the bistable or multi-stable characteristic of cholesteric liquid crystal. As Table 1 shows, the cholesteric display consumes much less power than other LCDs developed so far.

A third attribute of the novel LCD is a high brightness. The present invention does not require any polarizers. Therefore, its light efficiency is superior to existing transflective full color STN and TFT-LCDs.

A fourth attribute of the LCD of the present invention is the wide bandwidth. The cholesteric display can reflect white light if a high birefringence material is used. If no color filters are used, the proposed device has a high brightness black and white display.

Fifth, the novel LCD can easily provide a full color display. By using wide band reflective cholesteric liquid crystal, a full color display can be easily achieved by coating the color filters.

The sixth advantage of the present invention is that the process of fabrication is compatible with conventional LCD fabrication. A full color transflective cholesteric display can be fabricated by using wide band cholesteric liquid crystal, coating slant reflector and color filters on the backside of the top substrate, usually made of glass. The fabrication processes are compatible with conventional STN and TN LCDs.

The seventh advantage is related to the single cell gap used for both reflective and transmissive displays. Due to the same cell gap, the driving voltage and response time for the reflective and transmissive displays are the same.

EXAMPLE 1

Narrow Band Color Cholesteric Display

The front slant reflector concept can apply to both narrow and broadband full color cholesteric LCDs. The major difference is in the LC birefringence employed. As FIGS. 9(a) and 9(b) show, the front slant reflectors 101, 102 are deposited on the backside of the top substrate. The slant reflectors are positioned right above the transmissive pixels 103, 104. FIG. 9(a) is a perspective view of the narrow band color cholesteric display and FIG. 9(b) is a cross-sectional view of 9(a). Unlike the conventional cholesteric LC display, our transflective display can be used in any ambient conditions. Without using color filters, the display will have excellent light efficiency. However, it is a single color display wherein the bandwidth is determined by the pitch length and birefringence product, $\Delta\lambda = p\Delta n$.

EXAMPLE 2

Wide Band Cholesteric Liquid Crystal Simulation

Figure 10:
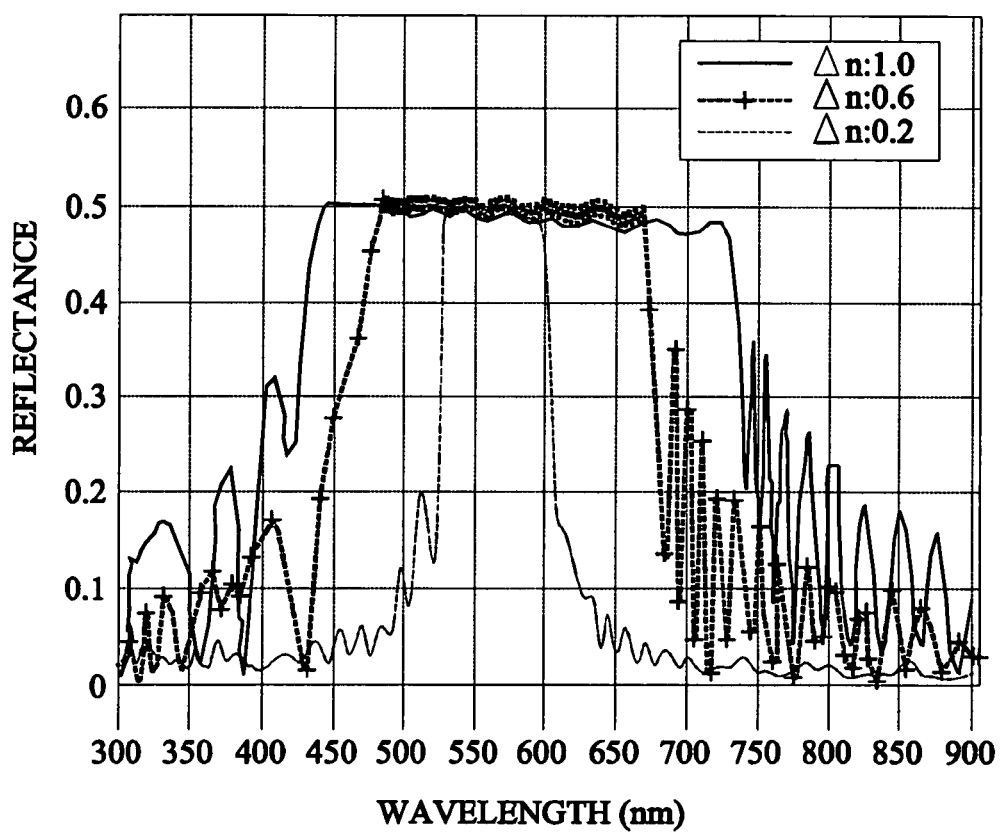
FIG. 10 shows the computer simulation results of the birefringence dependent reflection bandwidth of a cholesteric display.

FIG. 10 shows the computer simulation results of the reflectance of right-hand circular polarization (RCP) mode for unpolarized input with right hand LC. The graph plots the birefringence dependent reflection bandwidth of a cholesteric display. The $\Delta n$ values used for calculations are 0.2, 0.6 and 1.0, shown as dash, -plus and solid lines, respectively. Obviously, when the birefringence is larger than 0.6, the reflection bandwidth covers almost the entire visible spectrum. The maximum reflectivity reaches 50%.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

The invention claimed is:

1. A transflective cholesteric liquid crystal display, comprising:
   a top substrate coated with an electrode;
   a bottom substrate coated with an electrode, the bottom substrate having a transparent transmissive region and a non-transparent region;
   a cholesteric liquid crystal sandwiched between the top substrate and the bottom substrate; and
   a slant reflector deposited on the top substrate and positioned above the transmissive region for reflecting backlight into the non-transparent region.

2. The transflective cholesteric liquid crystal display of claim 1 further comprising:
   a color filter on the top substrate adjacent to the slant reflector to achieve and maintain good readability in any ambient.

3. The transflective cholesteric liquid crystal display of claim 1, wherein the cholesteric liquid crystal has a birefringence larger than 0.08.

4. The transflective cholesteric liquid crystal display of claim 1, wherein the non-transparent region on the bottom substrate is coated with an absorption layer to absorb light.

5. The transflective cholesteric liquid crystal display of claim 4, wherein the ambient light and backlight both pass through the color filter twice so that they have similar color saturation.

6. A method of forming a full color transflective cholesteric liquid crystal (LC) display, comprising the steps of:
   (a) dividing each pixel in an LC display into reflective portion and a transmissive portion;
   (b) positioning a slant reflector in the transmissive portion for reflecting backlight into the reflective pixel;
   (c) selecting high birefringence LC materials in the LC display to achieve black and white display; and
   (d) implementing RGB color filters with the LC display to achieve and maintain good readability in any ambient.

7. The method of claim 6, wherein the reflective portion has reflection pixels.

8. The method of claim 6, wherein the transflective portion includes a reflective mode having reflection pixels and a transmissive mode having transmission pixels.

9. The method of claim 6, further comprising the step of:
   applying the display to a narrow band cholesteric display.

10. The method of claim 6, further comprising the step of:
    applying the display to a broad band cholesteric, display.

11. The method of claim 6, where the high birefringence LC materials in the LC display act as a light switch.

12. A cholesteric liquid crystal(LC) display, comprising:
    means for dividing each pixel in an LC display into reflective and transmissive portions;
    means for selecting high birefringence LC materials larger than 0.08 in the LC display to achieve black and white display portions;
    means for providing an RGB color filter for the LC display wherein the same color images are produced using both reflective and transmissive portions and a slant reflector in the transmissive portion for reflecting backlight into reflective portion.

13. The display of claim 12, wherein the display includes:
    a narrow band cholesteric liquid crystal layer.

14. The display of claim 12, wherein the display includes:
    a broad band cholesteric liquid crystal layer.

15. The display of claim 12, wherein the display is readable in bright and dark light.

* * * * *